UNITED STATES PATENT OFFICE.

GEORGE M. HOWARD, OF PHILADELPHIA, PENNSYLVANIA.

NEGATIVE-POLE PLATE FOR SECONDARY OR STORAGE BATTERIES.

1,156,686.  Specification of Letters Patent.  Patented Oct. 12, 1915.

No Drawing.  Application filed February 16, 1910. Serial No. 544,250.

*To all whom it may concern:*

Be it known that I, GEORGE M. HOWARD, a citizen of the United States, and a resident of Philadelphia, in the county of Philadelphia and State of Pennsylvania, have invented certain new and useful Improvements in Negative-Pole Plates for Secondary or Storage Batteries, of which the following is a specification.

The principal object of the present invention is to provide a negative pole plate which can be stored, shipped or handled, without deterioration, in a dry state and which can be easily brought to a state of full charge when mounted in a battery without substantial heating and without requiring the use of an excessive amount of current.

One embodiment of the invention comprises a dry negative pole plate substantially free from lead oxid and consisting of finely divided metallic lead with sulfate of lead sufficient to bind the particles of metallic lead to prevent disintegration of the active material or material to become active during handling or shipment. A plate of this character can be made by permitting an ordinary negative pole plate to discharge partially or to the extent of its capacity. Such a plate may be washed with water to remove whatever electrolyte may adhere to it. The plate then consists of finely divided metallic lead and sulfate of lead, which after the plate has been dried under conditions to be presently set forth is sufficient for holding the particles of metallic lead together during shipment and handling. Such a plate is dried under conditions which prevent, retard or oppose the oxidation of the metallic lead remaining in its active material or material to become active. Examples of such conditions are the drying of the plate in a vacuum or in a non-oxidizing atmosphere such as nitrogen, illuminating, or hydrogen gases. Another example is the immersion of the plate in a non-oxidizing liquid, such as alcohol to wash out the water so that when the plate is dried the lead of its active material or material to become active will not be substantially oxidized.

It is unnecessary to attempt to state positively the amount of sulfate which should be present and the permissible amount of oxid of lead which may be present and the necessary amount of metallic lead, but it may be said that there should be sufficient sulfate of lead for insuring the necessary cohesion of the particles of lead, but not enough sulfate of lead to make it difficult to charge the plate when it is mounted in a battery, and it may be said that there should not be present enough oxid for causing a substantial rise in temperature when the plates are mounted in the electrolyte in their cells. Those skilled in the art will readily understand the necessary proportions for accomplishing these results and the manner in which the relative proportions are to be attained. As an example, but not the only example, I take a negative pole plate $8\frac{5}{8}''$ high, $5\frac{3}{4}''$ wide and $\frac{3}{16}''$ thick, whose rate of capacity is 28 ampere hours, discharge it for 20 ampere-hours, more or less, wash it in water, mount it in a vacuum drier and at a temperature of 160° F. dry it in a vacuum. Plates prepared in this manner can be handled and shipped without disintegration of their active material, and when set up in the electrolyte of their cells will not cause an appreciable rise in temperature and can be brought to a state of full charge with comparatively little or no more charge than that required to charge a discharged battery.

What I claim is:

A negative pole plate the active material of which is dry and contains metallic lead, whereby it will receive its charge readily, and sufficient sulfate of lead for binding the metallic lead, whereby it may be shipped and handled, and which is also substantially free from oxid, whereby it will not heat when immersed in electrolyte.

In testimony whereof I have hereunto signed my name.

GEORGE M. HOWARD.

Witnesses:
EDGAR LONGAKER,
J. WESLEY SEEGER.